(12) United States Patent
Roque et al.

(10) Patent No.: US 10,783,304 B1
(45) Date of Patent: Sep. 22, 2020

(54) SYSTEM, METHOD, AND COMPUTER PROGRAM PRODUCT FOR DISPLAYING DEBUGGING DURING A FORMAL VERIFICATION

(71) Applicant: Cadence Design Systems, Inc., San Jose, CA (US)

(72) Inventors: Thiago Radicchi Roque, Oakland, CA (US); Stefan Staber, Munich (DE); Chung-Wah Norris Ip, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 47 days.

(21) Appl. No.: 16/145,535

(22) Filed: Sep. 28, 2018

(51) Int. Cl.
*G06F 30/00* (2020.01)
*G06F 30/3323* (2020.01)
*G06F 30/30* (2020.01)
*G06F 111/04* (2020.01)

(52) U.S. Cl.
CPC .......... *G06F 30/3323* (2020.01); *G06F 30/30* (2020.01); *G06F 2111/04* (2020.01)

(58) Field of Classification Search
CPC .............. G06F 17/504; G06F 17/5045; G06F 2217/06; G06F 30/3323; G06F 30/30; G06F 2111/04
See application file for complete search history.

(56) References Cited

U.S. PATENT DOCUMENTS

| | | | | |
|---|---|---|---|---|
| 5,319,260 A * | 6/1994 | Wanlass | ............... | H03K 17/167 326/121 |
| 5,842,192 A * | 11/1998 | Garcia | .................... | G06F 30/00 706/45 |
| 7,076,753 B2 * | 7/2006 | Cerny | .................... | G06F 17/504 703/16 |
| 7,337,022 B2 * | 2/2008 | Wojsznis | ............... | G05B 11/32 700/28 |
| 7,350,166 B2 * | 3/2008 | Baumgartner | ...... | G06F 17/5045 716/103 |
| 7,421,668 B1 * | 9/2008 | Ip | .......................... | G06F 17/504 716/108 |
| 7,516,109 B2 * | 4/2009 | Furtek | ................. | G06F 11/3608 706/19 |
| 7,984,401 B2 * | 7/2011 | Lehavot | ............. | G06F 17/5081 716/106 |
| 8,381,148 B1 * | 2/2013 | Loh | ....................... | G06F 17/505 703/16 |

(Continued)

*Primary Examiner* — Naum Levin
(74) *Attorney, Agent, or Firm* — Mark H. Whittenberger, Esq.; Holland & Knight LLP (57) ABSTRACT

The present disclosure relates to a method for electronic design. Embodiments may include displaying, at a graphical user interface, at least a portion of a cover trace or an assertion counter-example associated with an electronic design. Embodiments may also include allowing, at the graphical user interface, a user to analyze the cover trace or the assertion counter-example during a debugging session. Embodiments may further include identifying a dead-end state during the analysis and converting one or more constraints used in the debugging session to soft constraints. Embodiments may further include identifying at least one trace, based upon, at least in part, the soft constraints and displaying at least one unsatisfied constraint associated with the identified trace at the graphical user interface.

20 Claims, 7 Drawing Sheets

(56) References Cited

U.S. PATENT DOCUMENTS

| | | | | |
|---|---|---|---|---|
| 8,863,049 B1* | 10/2014 | Lundgren | ............. | G06F 17/504 |
| | | | | 716/106 |
| 9,633,153 B1* | 4/2017 | Khaikin | ............. | G06F 17/5022 |
| 10,108,767 B1* | 10/2018 | Purri | ..................... | G06F 17/504 |
| 10,289,798 B1* | 5/2019 | Nunes Barcelos | .......................... | |
| | | | | G06F 17/5081 |
| 10,380,301 B1* | 8/2019 | Goyal | ................. | G06F 17/5045 |
| 10,380,312 B1* | 8/2019 | Deaton | .............. | G06F 17/5081 |
| 2014/0195209 A1* | 7/2014 | Satpathy | ............... | G06F 17/504 |
| | | | | 703/2 |
| 2018/0157574 A1* | 6/2018 | Mitra | .................. | G06F 11/3003 |
| 2019/0034571 A1* | 1/2019 | Sarwary | ............. | G06F 17/5045 |

\* cited by examiner

FIG. 1

```
202 ─┐
      │  displaying, at a graphical user interface, at least a portion of a cover trace or
      │  an assertion counter-example associated with an electronic design
```

```
204 ─┐
      │  allowing, at the graphical user interface, a user to analyze the cover trace or
      │  the assertion counter-example during a debugging session
```

```
206 ─┐
      │  identifying a dead-end state during the analysis
```

```
208 ─┐
      │  converting one or more constraints used in the debugging session to soft
      │  constraints
```

```
210 ─┐
      │  identifying at least one trace, based upon, at least in part, the soft constraints
```

```
22 ─┐
     │  displaying at least one unsatisfied constraint associated with the identified
     │  trace at the graphical user interface
```

SYSTEM, METHOD, AND COMPUTER PROGRAM PRODUCT FOR DISPLAYING DEBUGGING DURING A FORMAL VERIFICATION

TECHNICAL FIELD

The present disclosure relates to electronic design, and more specifically, to a method for debugging in an electronic design.

DISCUSSION OF THE RELATED ART

Over the last 30 years, the complexity of integrated circuits has increased greatly. This increase in complexity has exacerbated the difficulty of verifying circuit designs. In a typical integrated circuit design process, which includes many steps, the verification step consumes approximately 70-80% of the total time and resources. Aspects of the circuit design such as time-to-market and profit margin greatly depend on the verification step. As a result, flaws in the design that are not found during the verification step can have significant economic impact by increasing time-to-market and reducing profit margins. To maximize profit, therefore, the techniques used for verification should be as efficient as possible.

As the complexity in circuit design has increased, there has been a corresponding improvement in various kinds of verification and debugging techniques. In fact, these verification and debugging techniques have evolved from relatively simple transistor circuit-level simulation (in the early 1970s) to logic gate-level simulation (in the late 1980s) to the current art that uses Register Transfer Language (RTL)-level simulation. RTL describes the registers of a computer or digital electronic system and the way in which data are transferred among the combinational logic between registers.

Existing verification and debugging tools are used in the design flow of a circuit. The design flow begins with the creation of a circuit design at the RTL level using RTL source code. The RTL source code is specified according to a Hardware Description Language (HDL), such as Verilog HDL or VHDL. Circuit designers use high-level hardware description languages because of the size and complexity of modern integrated circuits. Circuit designs are developed in a high-level language using computer-implemented software applications, which enable a user to use text-editing and graphical tools to create a HDL-based design.

An increasingly popular technique is to use formal methods to verify the properties of a design completely. Formal methods use mathematical techniques to prove that a design property is either always true or to provide an example condition (called a counterexample) that demonstrates the property is false. Tools that use formal methods to verify RTL source code and design properties are known as "model checkers." Design properties to be verified include specifications and/or requirements that must be satisfied by the circuit design. Since mathematical properties define the design requirements in pure mathematical terms, this enables analysis of all possible valid input sequences for a given circuit and is akin to an exhaustive simulation. Formal verification methods are therefore exhaustive, when compared for example to simulation methods, and they may provide many benefits, such as reduced validation time, quicker time-to-market, reduced costs, and high reliability.

Formal verification involves heavy mathematical computation, and traditional formal verification tools place a heavy emphasis on automation. Therefore, users typically let their formal verification tools run in a batch mode instead of interactively, frequently waiting overnight for the complex analysis to finish. But the lack of interactivity leaves the designer's insights into the design out of the process, ultimately making the formal verification less effective.

In existing approaches users run the formal proof to get a list of failed properties. The proof engines can provide the counter example to the user in order to debug the failures in an electronic design automation environment. The user may apply constraints on the current waveform to create a new alternate waveform. If the new waveform fails some existing properties, the user may debug these failures.

SUMMARY OF DISCLOSURE

In one or more embodiments of the present disclosure, a computer-implemented method is provided. The method may include displaying, at a graphical user interface, at least a portion of a cover trace or an assertion counter-example associated with an electronic design. The method may also include allowing, at the graphical user interface, a user to analyze the cover trace or the assertion counter-example during a debugging session. The method may further include identifying a dead-end state during the analysis and converting one or more constraints used in the debugging session to soft constraints. The method may further include identifying at least one trace, based upon, at least in part, the soft constraints and displaying at least one unsatisfied constraint associated with the identified trace at the graphical user interface.

One or more of the following features may be included. In some embodiments, the dead-end state may be a result of adding one or more additional constraints, the result of a freeze operation and/or an extend operation. The at least one unsatisfied constraint may be a soft constraint. Identifying at least one trace may be based upon, at least in part, a formal engine analysis. Identifying at least one trace may be based upon, at least in part, a quiet trace analysis.

In one or more embodiments of the present disclosure a computer-readable storage medium having stored thereon instructions, which when executed by a processor result in one or more operations is provided. Operations may include displaying, at a graphical user interface, at least a portion of a cover trace or an assertion counter-example associated with an electronic design. Operations may also include allowing, at the graphical user interface, a user to analyze the cover trace or the assertion counter-example during a debugging session. Operations may further include identifying a dead-end state during the analysis and converting one or more constraints used in the debugging session to soft constraints. Operations may further include identifying at least one trace, based upon, at least in part, the soft constraints and displaying at least one unsatisfied constraint associated with the identified trace at the graphical user interface.

One or more of the following features may be included. In some embodiments, the dead-end state may be a result of adding one or more additional constraints, the result of a freeze operation and/or an extend operation. The at least one unsatisfied constraint may be a soft constraint. Identifying at least one trace may be based upon, at least in part, a formal engine analysis. Identifying at least one trace may be based upon, at least in part, a quiet trace analysis.

In one or more embodiments of the present disclosure, a system is provided. The system may include at least one processor configured to display, at a graphical user interface, at least a portion of a cover trace or an assertion counter-example associated with an electronic design. The at least one processor may be further configured to allow, at the graphical user interface, a user to analyze the cover trace or the assertion counter-example during a debugging session. The at least one processor may be further configured to identify a dead-end state during the analysis and to convert one or more constraints used in the debugging session to soft constraints. The at least one processor may be further configured to identify at least one trace, based upon, at least in part, the soft constraints. The at least one processor may be further configured to display at least one unsatisfied constraint associated with the identified trace at the graphical user interface.

One or more of the following features may be included. In some embodiments, the dead-end state may be a result of adding one or more additional constraints, the result of a freeze operation and/or an extend operation. The at least one unsatisfied constraint may be a soft constraint. Identifying at least one trace may be based upon, at least in part, a formal engine analysis. Identifying at least one trace may be based upon, at least in part, a quiet trace analysis.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Figure 1:
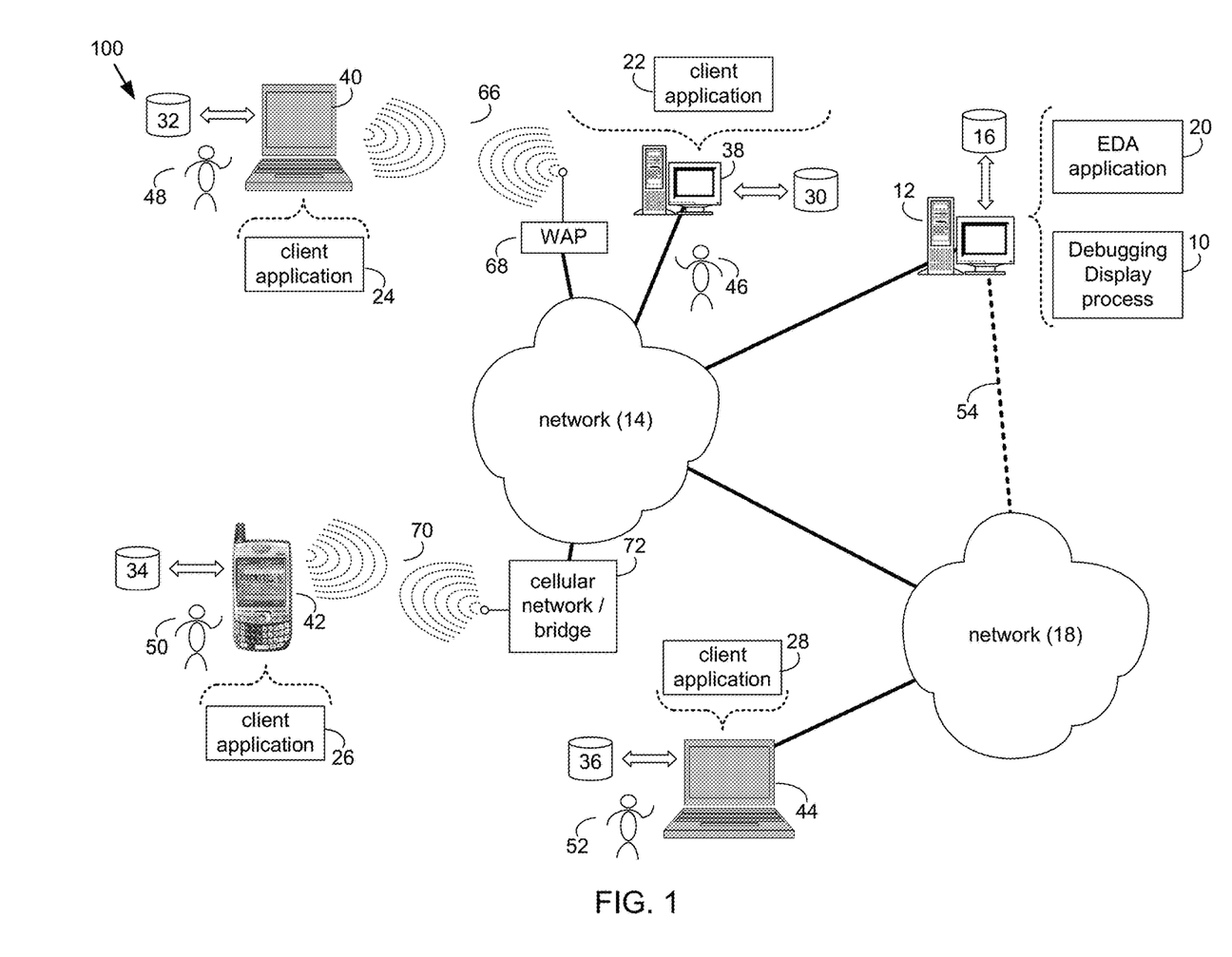
FIG. 1 is a diagram depicting an embodiment of a system in accordance with the present disclosure.

Referring to FIG. 1, there is shown a debugging display process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, debugging display process 10 may reside on and be executed, in whole or in part, by a client electronic device, such as a personal computer, notebook computer, personal digital assistant, or the like.

The instruction sets and subroutines of debugging display process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Web server is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Debugging display process 10 may be a stand alone application, or may be an applet/application/script that may interact with and/or be executed within EDA application 20. In addition/as an alternative to being a server-side process, debugging display process 10 may be a client-side process (not shown) that may reside on a client electronic device (described below) and may interact with an EDA client application (e.g., one or more of EDA client applications 22, 24, 26, 28). Further, debugging display process 10 may be a hybrid server-side/client-side process that may interact with EDA application 20 and an EDA client application (e.g., one or more of client applications 22, 24, 26, 28). As such, debugging display process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize debugging display process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to ANDROID™, Ios™, Microsoft Windows, Microsoft Windows CE®, Red Hat Linux, or other suitable operating system. (Windows CE is a registered trademark of Microsoft Corporation in the United States, other countries, or both.).

Figure 2:
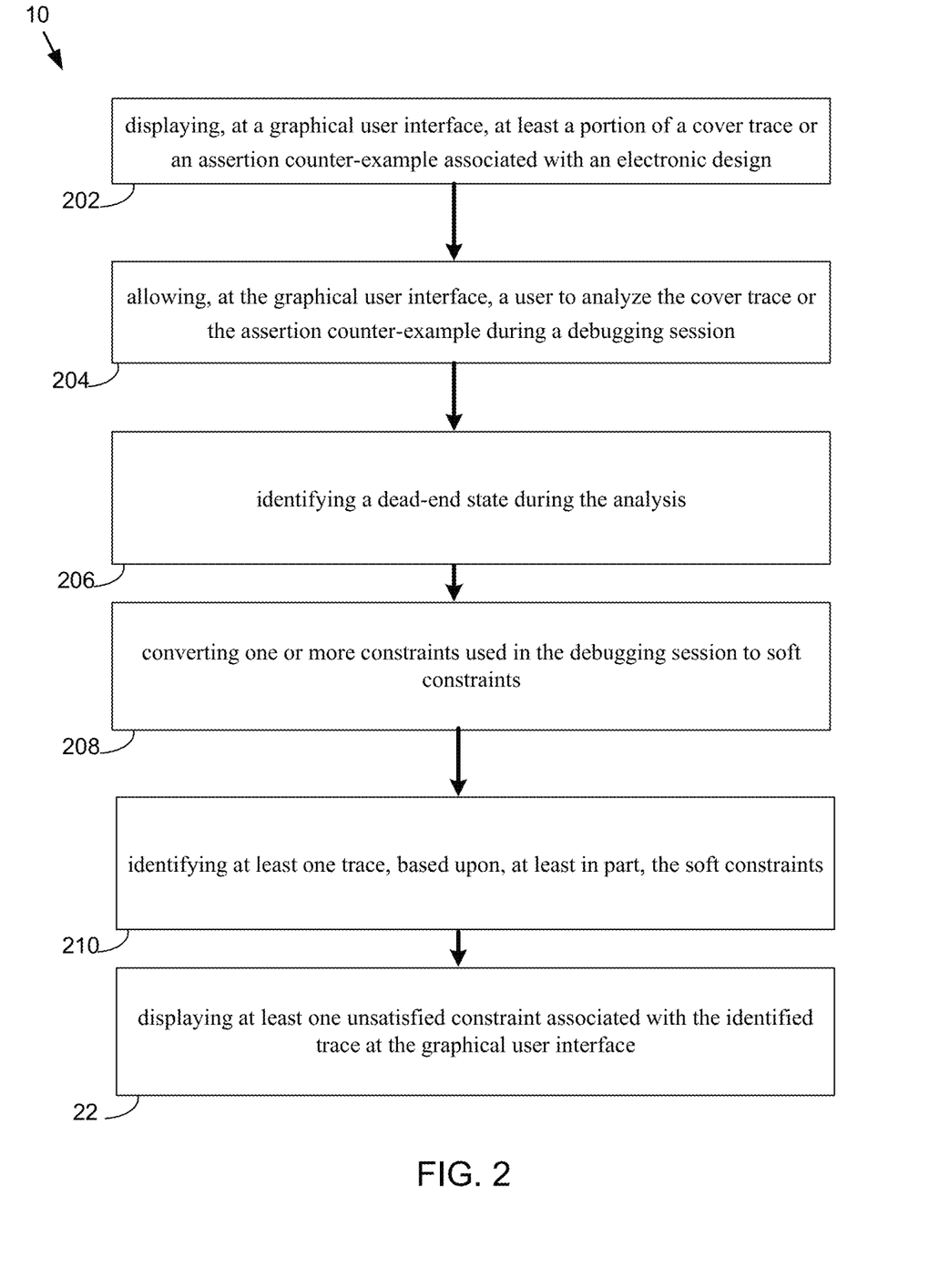
FIG. 2 is a flowchart depicting operations consistent with the debugging display process in accordance with an embodiment of the present disclosure.

Referring now to FIG. 2, an exemplary flowchart 200 depicting operations consistent with debugging display process 10 is provided. Debugging display process 10 may include displaying 202, at a graphical user interface, at least a portion of a cover trace or an assertion counter-example associated with an electronic design. Embodiments may also include allowing 204, at the graphical user interface, a user to analyze the cover trace or the assertion counter-example during a debugging session. Embodiments may further include identifying 206 a dead-end state during the analysis and converting one or more constraints used in the debugging session to soft constraints. Embodiments may further include identifying at least one trace, based upon, at least in part, the soft constraints and displaying at least one unsatisfied constraint associated with the identified trace at the graphical user interface.

Figure 3:
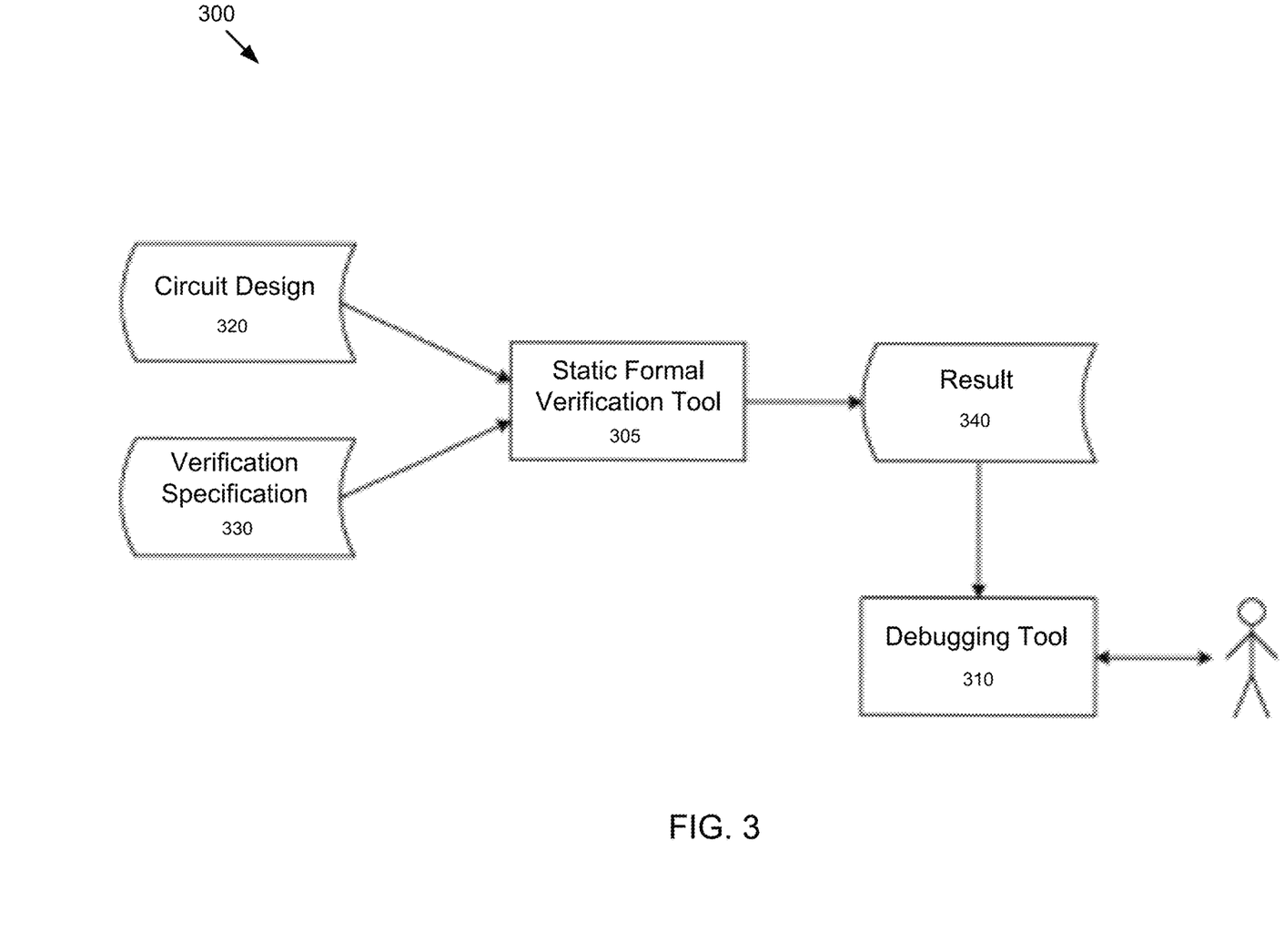
FIG. 3 is a diagram depicting an embodiment in accordance with the present disclosure.

Referring also to FIGS. 3, an embodiment of a methodology for formal verification of a circuit design 320 is provided. The circuit design 320 may be embodied in a data file encoded using a hardware description language (HDL), which may describe the structural design and operation of a circuit. A set of requirements may be derived from a design specification for the circuit and then used to test whether the circuit design is compliant with the design specification. A user, such as a circuit designer or a verification engineer, may supply the requirements for the circuit design. The requirements may be encoded in a verification specification 330 as one or more properties and/or assumptions for the circuit design 320, encoded for example using Property Specification Language (PSL) or SystemVerilog Assertion (SVA). The verification specification 330 may be directly coded by a user or captured in an automated process. A property may be represented in the verification specification 330 as an assertion, where the assertion is satisfied if the property is true for all operating conditions of the circuit design 320. A property may also be represented in the verification specification 330 as a cover, where the cover is satisfied if the property is true for some operating condition of the circuit design 320. An assumption specifies that certain input signals to the circuit design may only take on pre-determined values (i.e., 0 or 1) at certain clock cycles when testing the circuit design against the property.

In a formal verification process, the verification tool 305 may receive a circuit design 320 and a verification specification 330 for testing the circuit design 320 against a set of requirements. The circuit design 320 and verification specification 330 may be represented in one or more files containing HDL code, which define a digital design and/or properties that give a functional specification of the design. The verification tool 305 may convert the inputs (i.e., the circuit design 320 and verification specification 330) into an internal representation using one or more data structures, such as a netlist. This conversion may comprise two different conversions: (1) synthesis of the input circuit design 320, and (2) property compilation of the properties in the verification specification 330.

The results of the design synthesis and the property compilation may then be combined into a common problem instance that is given as input to a model checker in the verification tool 305. The verification tool 305 then performs formal verification on the circuit design 320 using the statically allocated data structure. For assertions, during the formal verification process, the model checker attempts to determine whether there is a possible behavior of the circuit design 320 where one of the properties in the verification specification 330 are not true, which is called a counterexample for the property. If it is determined that no counterexample exists for a property, the property is said to be proven. The results 340 of the formal verification process thus comprise an indication of whether one or more of the properties are satisfied, and if not, the counterexample showing a condition under which the property fails. The counterexample includes a sequence of values for signals (input, internal, or output) of the circuit design over a number of clock cycles that satisfy the given assumptions but result in the property failure.

The verification of a cover may proceed in a similar way. In one embodiment, for a cover, the verification tool attempts to determine whether there is a possible behavior of the circuit design that satisfies the cover, which is called a cover trace. This cover trace includes a sequence of values for signals of the circuit design over a number of clock cycles that satisfy the given assumption and satisfy the cover.

The verification tool 305 outputs the result 330 of the verification process, which may be stored in memory, passed along to another software process, or displayed to the user. The result may comprise a counterexample if the circuit design 320 fails to meet the properties encoded in the verification specification or a witness if the design 320 satisfies the properties (e.g., the witness can be a cover trace). A debugging tool 310 may also be included to display the counterexample or witness to a circuit designer in a useful way to the designer. In one embodiment, the debugging tool 310 accepts the circuit design 320, verification specification 330, and result 340 as inputs and applies one or more soft constraints to the result 340 to create a quieter trace. This can facilitate understanding of what aspect of the HDL code in the circuit design 320 is responsible for the counterexample to the property in question. The debugging tool 310 may include a viewer as well as editing software. Additional information regarding soft constraints may be found in U.S. Pat. No. 8,863,049, the entire contents of which is herein incorporated by reference in its entirety.

Embodiments of the invention provide a debugging tool 310 that helps the circuit designer understand counterexamples that are identified during a formal verification process, and thereby more easily debug the circuit design when counterexamples are found. In operation, debugging tool 310 first receives the results from the verification tool 305 and presents them to the user. In other embodiments, the results may be received from a source other than the verification tool 305. The user may choose a counterexample to analyze, and the debugging tool 310 receives this user selection of which counterexample to analyze. The debugging tool 310 may also present a trace of the counterexample to the user by displaying the individual signals of the counterexample in a waveform over a finite number of clock cycles.

The debugging tool 310 may then receive a user input instructing the debugging tool 310 to apply one or more soft constraints. A soft constraint is a preference that the counterexample should satisfy if possible, but does not necessarily need to satisfy. In one embodiment, soft constraints help in debugging a counterexample by suppressing irrelevant aspects of the trace that do not contribute to the violation of the property, thereby simplifying the appearance of the trace when displayed as a waveform. Example soft constraints include a preference for setting the value of all input signals to the circuit design to logic 0 or setting the value of all input signals to logic 1, subject to the condition that changing the value does not affect the property violation. Another type of soft constraint is a preference for reducing the overall activity (i.e., number of signal transitions) of signals in the counterexample regardless of whether the signal values should be set to logic 0 or logic 1, subject to the condition that changing the value does not affect the property violation. Constraints can also be defined to apply to input signals, internal design signals, arbitrary HDL expressions, and temporal SVA expressions.

Soft constraints are in contrast to hard constraints. Soft constraints are conditional preferences that do not necessarily need to be satisfied by the counterexample trace. For example, a constraint of "set signal A to 1 only if property P is still violated" is a soft constraint. By contrast, hard constraints are strict requirements that must satisfied by the counterexample trace. For example, a constraint of "set signal A to 1" has no limitations and is a hard constraint. The circuit design and its assumptions are the primary source of hard constraints because they define strict requirements that cannot be avoided.

In one embodiment, the user input comprises a user input that identifies one or more soft constraints for the debugging tool 310 to apply. For example, the user input may select a specific soft constraint from a list of soft constraints presented to the user. As another example, the user may enter a logical expression that defines a soft constraint, which is then received by the debugging tool 310 as a user input. In another embodiment, the debugging tool 310 may be configured to apply a default soft constraint, and the user input triggers the application of the default soft constraint.

The debugging tool 310 may then applies the soft constraints to the counterexample trace to generate an updated trace. Some soft constraints may be applied to all signals and all clock cycles in the counterexample, whereas other soft constraints may be applied to only a sub-set of the signals, clock cycles, or signal-cycle pairs. In one embodiment, a user marks certain signals or clock cycles as active, which is received by the debugging tool 310 as a user input. The debugging tool 310 applies the soft constraints only to the portions of the trace marked as active. The active portion of the trace may also be set according to a default configuration (e.g., all cycles active) when there is no user input specifying how the soft constraints should be applied.

In one embodiment, the debugging tool 310 applies the soft constraints to as many signal-cycle pairs as possible within the active portion of the trace. Each signal-cycle pair is considered to be independent of the other signal-cycle pairs. In other words, a soft constraint can be satisfied for a signal-cycle pair regardless of whether the soft constraint can be satisfied for another signal-cycle pair on the same signal. For example, if clock cycle 1 of a signal A cannot satisfy a soft constraint, the debugging tool may still attempt to satisfy the soft constraint for clock cycle 2 of signal A. The application of soft constraints effectively removes aspects of the trace that do not contribute to the violation of the property, resulting in a trace that appears "quieter" and is easier to use in debugging the circuit design.

In one embodiment, the debugging tool 310 applies multiple soft constraints to the trace. When multiple soft constraints are involved, the soft constraints are prioritized. Higher priority constraints are generally satisfied at the expense of the lower priority constraints. As such, the debugging tool 310 only satisfies lower priority constraints if it does not result in the violation of a higher priority constraint. The priority for the soft constraints may be set according to a pre-determined configuration or set according to a user input defining the priority order.

After application of the soft constraints, the debugging tool 310 displays a waveform of the updated counterexample trace to a user of the debugging tool 310. In one embodiment, rather than displaying just the updated counterexample trace, the updated counterexample trace is displayed simultaneously with the original counterexample trace. This helps the circuit designer to understand of how the trace has changed as a result of applying the soft constraints. For example, a waveform for the updated counterexample may be displayed side-by-side with or overlaid on top of a waveform for the original counterexample. In another embodiment, a waveform of the updated counterexample is displayed along with markings on the waveform at specific signal-cycle pairs to indicate how the counterexample has changed as a result of applying the soft constraints.

In another embodiment, the debugging tool 310 displays a waveform for a partially updated trace before the debugging tool 310 finishes applying the soft constraints. Applying soft constraints can take a lengthy amount of time to complete, depending on the size and complexity of the circuit design, assumptions, properties, and soft-constraints. To increase the usability of the debugging tool 310 in these situations, the debugging tool 310 may display a waveform of a partially updated counterexample while the trace that best satisfies the soft constraints is being identified by the debugging tool 310. The partially updated counterexample may be displayed automatically according to a pre-defined configuration (e.g., whenever results are available) or in response to a user input requesting that it be displayed.

In a further embodiment, after the updated trace is displayed, the debugging tool 310 allows the user to apply new soft or hard constraints to the updated counterexample trace, thereby generating a sequence of counterexample traces. To maintain similarity with the current trace, the current trace may be used as a soft constraint in determining the next trace. This creates a preference for similarity with the current trace, subject to the condition that the property is still violated. The debugging tool 310 thus attempts to make the next trace as similar as possible to current trace when applying the new constraint. For example, if the new constraint is a hard constraint, the resulting waveform highlights the forced changes caused by the hard constraint while reducing unnecessary changes to other signal-cycle pairs. As another example, if the new constraint is a soft constraint, the new constraint can be given a high priority while the soft constraint that prefers similarity with the current trace is given a lower priority.

The debugging tool 310 also enables the user to jump between the traces in the sequence to compare differences between the traces. For example, the debugging tool 310 receives a user input selecting a trace for display. In response, the debugging tool 310 displays a waveform of the selected trace to the user. This enables the circuit designer to visualize how the trace changes on an incremental basis as new constraints are applied to the trace, which facilitates the process of debugging a circuit design. Additional information regarding formal verification techniques, including quiet trace approaches described above, may be found in U.S. Pat. Nos. 7,506,288 and 8,863,049, which are each incorporated herein by reference in their entirety.

As discussed above, in existing systems, when users are looking for traces for a Visualize Recipe, if the proof run is producing multiple traces, users can start debugging these traces as soon as they become available. A Visualize Recipe may include a single target property, which can be an assertion or cover, and may also contain one or more hard constraints and soft constraints. The Visualize recipe allows the specification of special constraints called "force" and "at least once" constraints. Additional information regarding the concept of a visualize recipe may be found in U.S. Pat. No. 7,421,668, which is incorporated herein by reference in its entirety.

As used herein, the term "freeze" may be referred to as a situation where, given a trace displayed in a GUI associated with an EDA application 20, a user may select several cycles of such trace and determine that they should be immutable, meaning that the selected cycles should not be modified in any way when the user tries to generate new traces from the current one using different EDA application configurations. The term "extend" may be referred to as a situation where, given any trace displayed in a GUI associated with an EDA application 20, regardless if it has frozen cycles or not, EDA application 20 may be capable of extending such trace with as many extra cycles as specified by a user, as long as the initial trace is not in a dead-end state. Any reference herein to a "check_assumptions" command may refer to the ability to analyze some or all of the user's constraints in the verification environment, and determine if there are conflicts between any of them (one or more) and the design. It may also determine if in this specific verification environment, one or more of these constraints may lead to a dead-end state. It is not able to take into account the environment specific to a particular EDA application, which may include extra constraints and operations like "freeze" and "extend" discussed above.

Referring now to FIGS. 4-7, a number of diagrams consistent with embodiments of debugging display process 10 are provided. Typically, there are three most common types of overconstrained situations during debugging, namely, conflicting constraints (e.g., having a constraint in place that assigns a signal a certain value and having added a visualize constraint that contradicts the constraint by assigning the opposite value to said signal), a temporal constraint causing a dead-end due to a trace being frozen in visualize (e.g., having a visualize trace and the signal values cannot be changed by the tool in any cycles, but trying to force a signal change in at least one of the cycles by adding a visualize constraint for example) or a trace cannot be extended as it is in dead-end state. The last cycle of a trace may be in a "dead-end" state (e.g., if a trace was extended at least one assumption would be violated) due to conflicting assumptions. This may already be debugged in EDA application 20 for initial proof traces using "check_assumptions" as discussed herein. If a trace is extended a few times in EDA application 20, or modified with constraints and other operations, then there may not be a way today to know why it is in a dead-end scenario.

For example, in operation, a user may locate a cover trace, or assertion counter-example and want to debug it. The user may begin to explore the trace (e.g., tries to extend or freeze and extend). The user may also attempt to extend the trace but may not be able to because of a dead-end state. Optionally, the user may add specific constraints associated with EDA application 20 and face a dead-end state as well. In existing systems, a user generally does not know what caused the dead-end, and there is no good way to know why or debug it. Accordingly, and as is discussed in further detail below, embodiments of debugging display process 10, which may be part of debugging tool 310, may be configured to identify and debug what caused the dead-end state.

Figure 4:
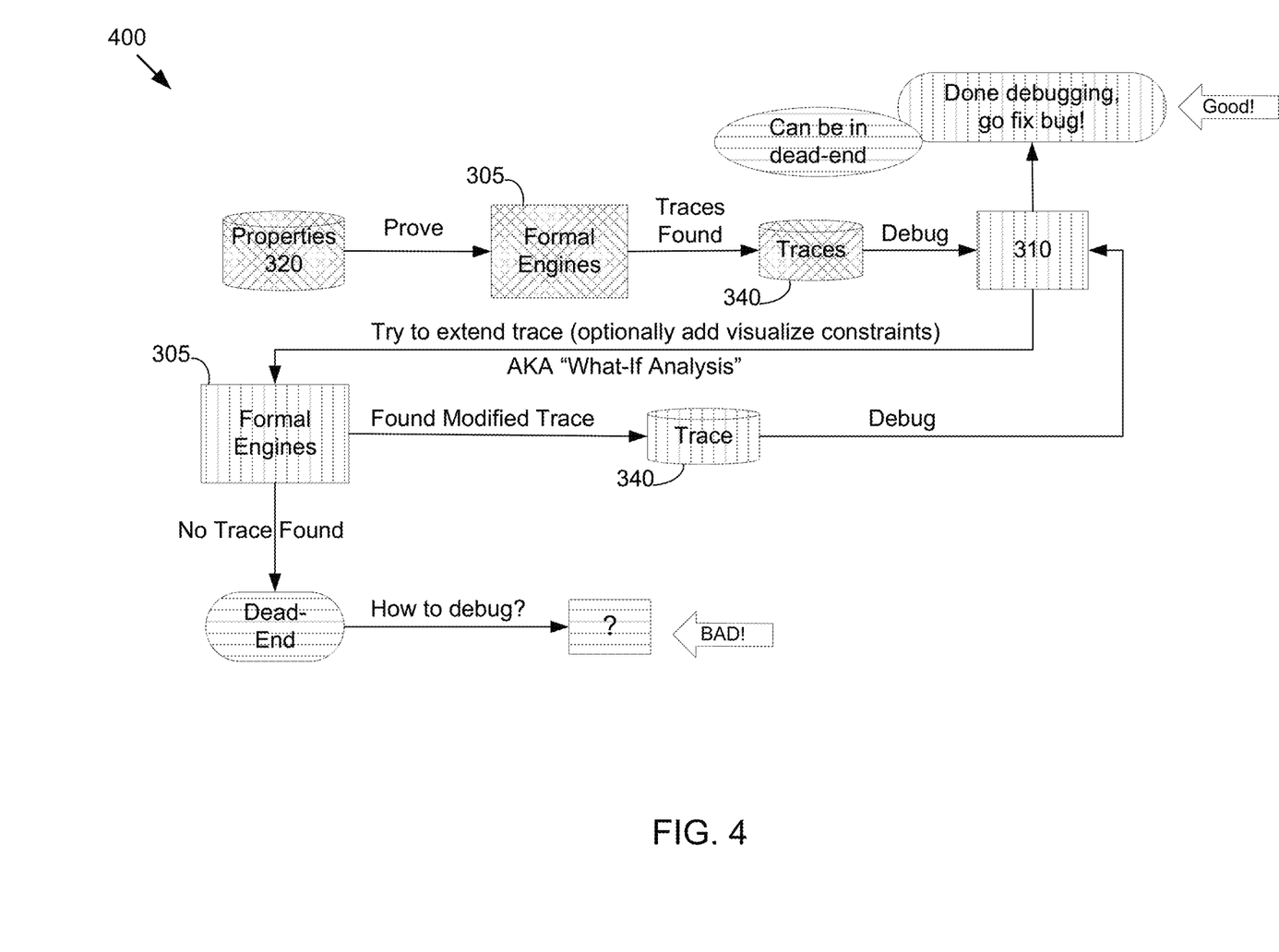
FIG. 4 is a diagram depicting an embodiment in accordance with the present disclosure.

Referring now to diagram 400 of FIG. 4, an example of a typical debugging flow leading to a dead-end is provided. In operation, a user may visualize a trace (e.g. result 340 from FIG. 3), for example using EDA application 20, and attempt to explore it by extending, freezing and/or adding constraints at a graphical user interface associated with EDA application 20. EDA application and/or debugging process 10 may be associated either in whole or in part with debugging tool 310. Occasionally, during this debugging procedure, the user may be faced with a situation where they get stuck, meaning that the trace cannot be extended anymore. This may be a result of one or more constraints that are preventing the trace from being extended, in other words, no extension exists that satisfies all constraints.

Figure 5:
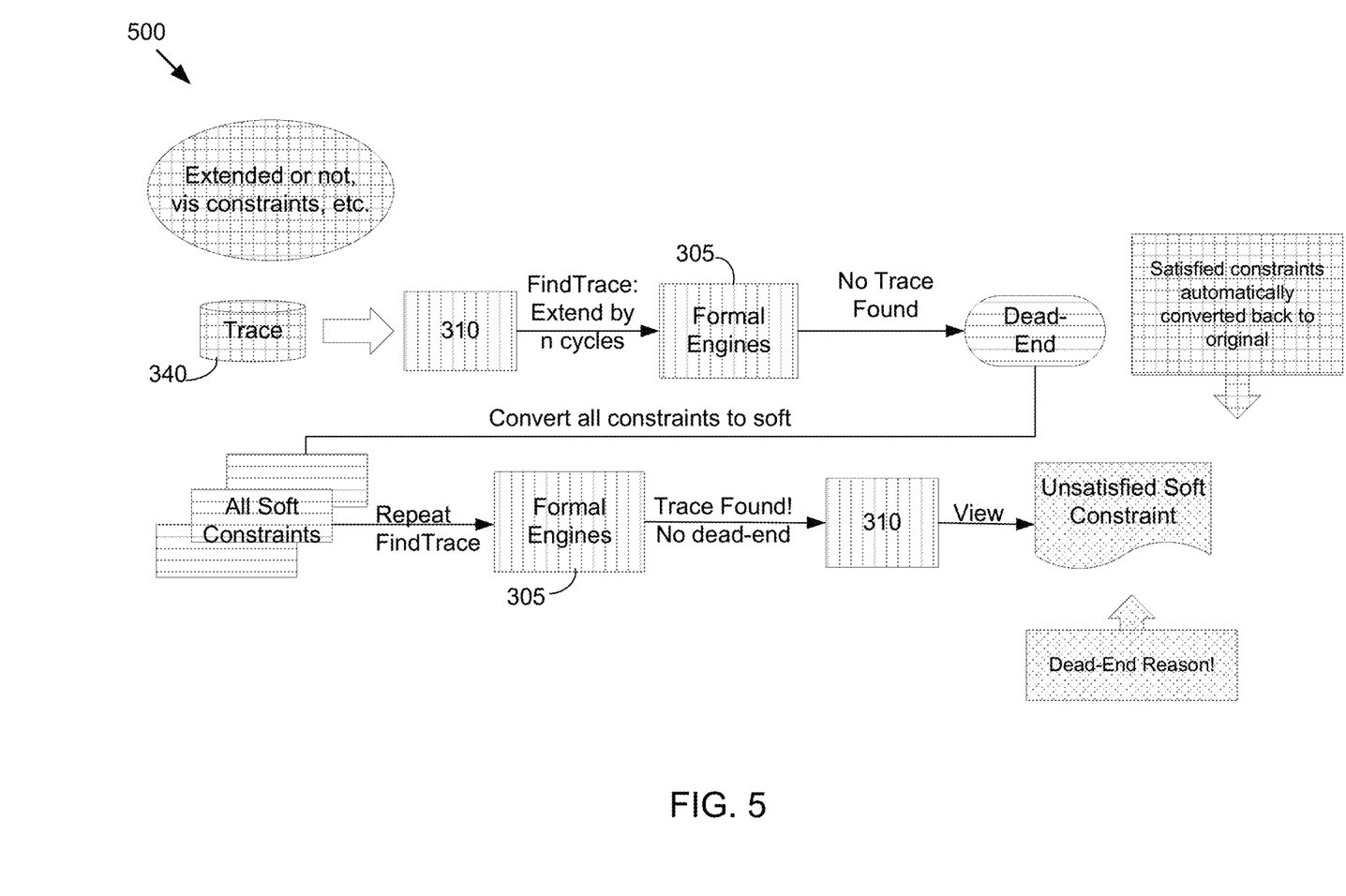
FIG. 5 is a diagram depicting an embodiment in accordance with the present disclosure.

Accordingly, and referring also to diagram 500 of FIG. 5, embodiments of debugging display process 10 may be configured to use the definition of soft constraints described above, which may indicate that EDA application 20 may attempt to satisfy them (e.g. using one or more formal engines), however if it is not possible, EDA application 20 may return a trace where they are not satisfied. If the user encounters a dead-end situation, embodiments of debugging display process 10 may be configured to transform some or all of the constraints into soft constraints (e.g., using QuietTrace approaches discussed herein and/or others, etc.), locate a trace, and display which constraint(s) were not satisfied. These may be the constraints causing the dead-end.

In some embodiments, debugging display process 10 may be configured to transform all constraints into soft constraints when the user runs into a dead-end situation. EDA application 20 may then locate traces with as many soft constraints satisfied as possible. The user may then look at which constraints are not satisfied in the trace and decide how to move forward. In some embodiments, the process can run until it identifies a single constraint responsible, but the user may be allowed to stop the process at any time and look at partial results.

Figure 6:
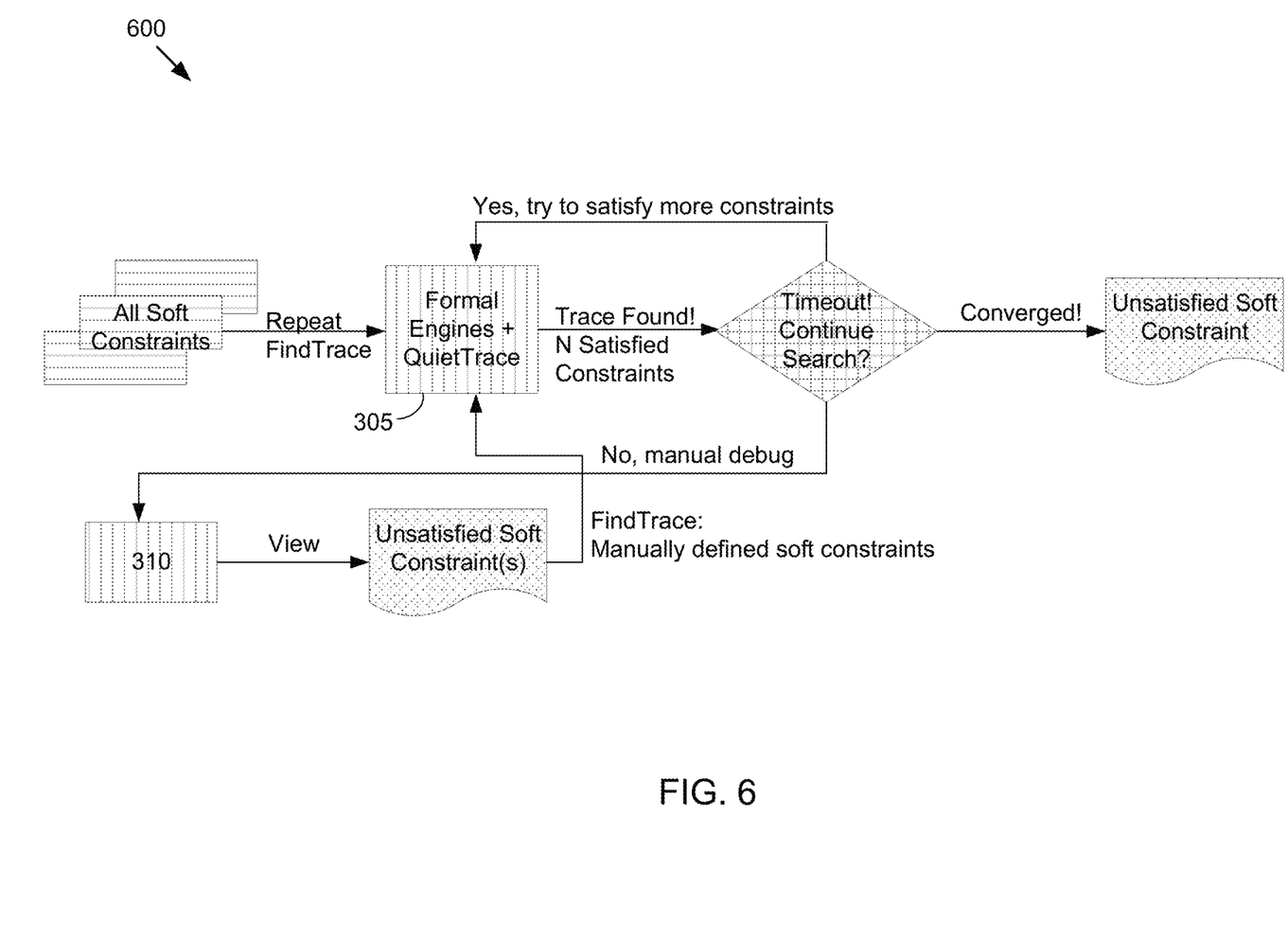
FIG. 6 is a diagram depicting an embodiment in accordance with the present disclosure.

Referring now to FIG. 6, a diagram 600 showing an embodiment of debugging display process 10 is provided. This particular example shows how the process may use an iterative refinement and manual intervention capabilities. For example, if too many constraints are present certain tools such as the QuietTrace capability described above may take an excessive amount of time. Accordingly, in some embodiments debugging display process 10 may be configured to satisfy them on an iteration-style loop without a timeout. In this way, a user may interrupt and guide continuation by manually selecting constraints to convert to soft constraints. The system may operate upon any trace, and the iterative mode may be interrupted by the user, showing partial results.

Figure 7:
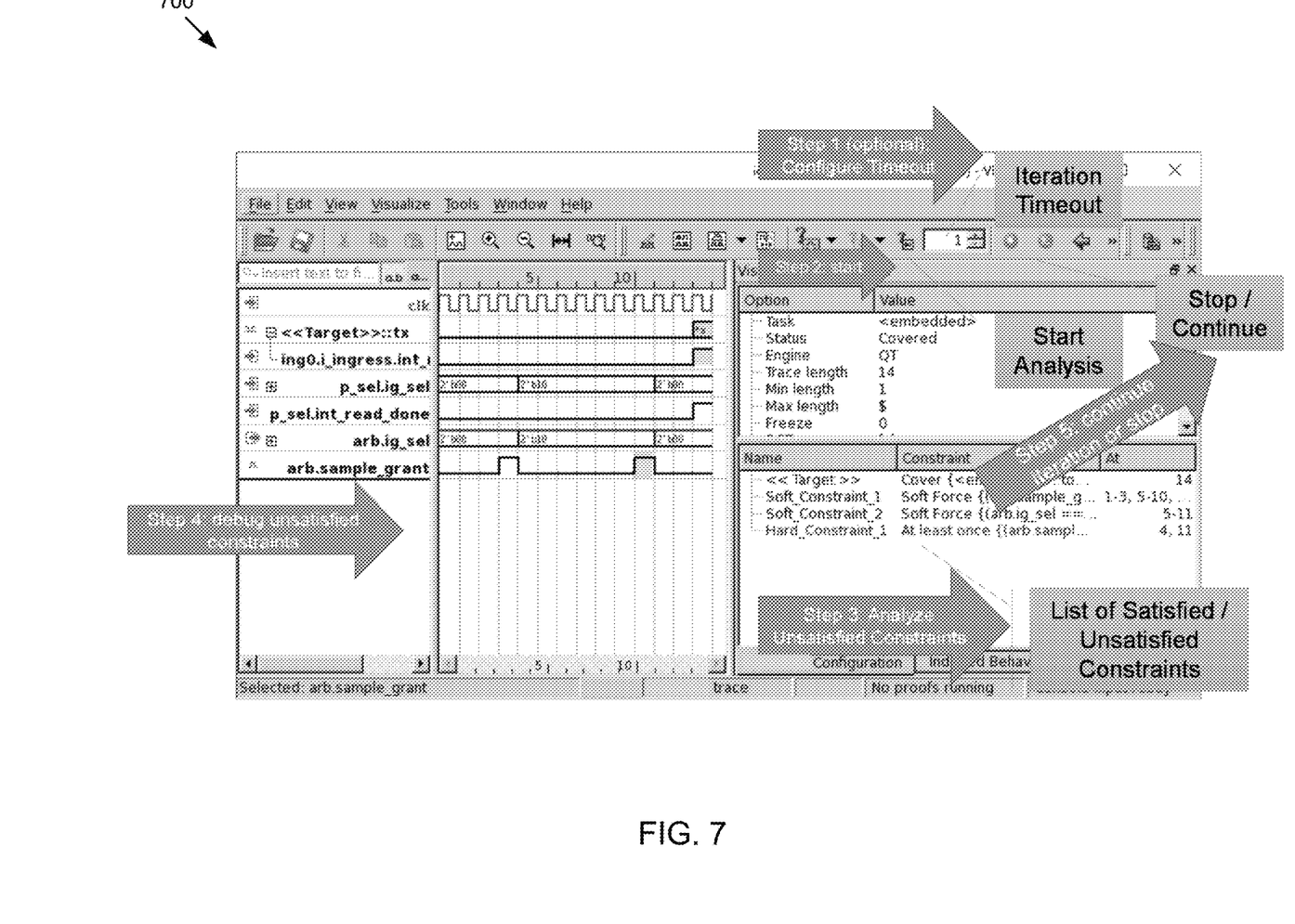
FIG. 7 is a graphical user interface depicting an embodiment in accordance with the present disclosure.

Referring also to FIG. 7, a graphical user interface 700 showing another embodiment of debugging display process 10 is provided. GUI 700 may be associated with debugging tool 310 and may be configured to display a start analysis capability, iteration timeout, stop and continue operations as well as a list of satisfied and unsatisfied constraints. In some embodiments, a user may select, edit, and/or adjust various parameters associated with each of these features and visualize a particular trace.

One example command line interface consistent with embodiments of debugging display process 10 is provided below:
  % visualize [-violation|-cover] . . .
  % visualize-min_length n
  % visualize-replot # Reached dead-end
    ERROR: no trace available->Formal environment is improperly setup, leading to a dead end scenario
  % visualize-check_assumptions-iteration_timeout n
  % visualize-check_assumptions-dead_end [-bg]
  % visualize-check_assumptions-list
  % visualize-check_assumptions-plot
  % visualize-check_assumptions-continue
  % visualize-check_assumptions-stop Embodiments of debugging display process 10 may provide numerous advantages over existing approaches. One approach involves a check_assumptions capability, that is able to detect a dead-end for proof traces. However, this does not work with traces that can be modified by the user in different ways (e.g. using the capabilities of debugging tool 310 associated with EDA application 20). The second approach is a manual iterative process where the user can disable constraints one by one and continue to try to find a trace. This is cumbersome, slow and error-prone. Another option relates to a command that allows the tool to always find infinite traces. The problem with this is that it may be very expensive to do so, and it limits the debugging capabilities as well, as existing approaches may not support all its features for "infinite" or "liveness" traces.

As such, and as discussed above, embodiments of debugging display process 10 may be configured to make the constraints into soft constraints, which means they will no longer cause a dead-end and allow the engines to always find traces. Existing approaches only apply to traces found by a prove command, and do not use the soft constraint approach. It uses a special engine that detects the dead-end and display the constraint responsible. This does not work for traces modified in an EDA application.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
  displaying, at a graphical user interface, at least a portion of a cover trace or an assertion counter-example associated with an electronic design;
  allowing, at the graphical user interface, a user to analyze the cover trace or the assertion counter-example during a debugging session;
  identifying a first dead-end state during the analysis;
  converting all constraints used in the debugging session to soft constraints;
  identifying at least one trace and avoiding a second dead-end state, based upon, at least in part, the soft constraints; and
  displaying at least one unsatisfied constraint associated with the identified trace at the graphical user interface.

2. The computer-implemented method of claim 1, wherein at least one of the first dead-end state and the second dead-end state is a result of adding one or more additional constraints.

3. The computer-implemented method of claim 1, wherein at least one of the first dead-end state and the second dead-end state is a result of a freeze operation.

4. The computer-implemented method of claim 1, wherein at least one of the first dead-end state and the second dead-end state is a result of an extend operation.

5. The computer-implemented method of claim 1, wherein the at least one unsatisfied constraint is a soft constraint.

6. The computer-implemented method of claim 1, wherein identifying at least one trace is based upon, at least in part, a formal engine analysis.

7. The computer-implemented method claim 1, wherein identifying at least one trace is based upon, at least in part, a quiet trace analysis.

8. A non-transitory computer-readable storage medium having stored thereon instructions that when executed by a machine result in the following operations:
  displaying, at a graphical user interface, at least a portion of an assertion counter-example associated with an electronic design;

allowing, at the graphical user interface, a user to analyze the assertion counter-example during a debugging session;

identifying a first dead-end state during the analysis;

converting all constraints used in the debugging session to soft constraints;

identifying at least one trace and avoiding a second dead-end state, based upon, at least in part, the soft constraints; and displaying at least one unsatisfied constraint associated with the identified trace at the graphical user interface.

9. The non-transitory computer-readable storage medium of claim 8, wherein at least one of the first dead-end state and the second dead-end state is a result of adding one or more additional constraints.

10. The non-transitory computer-readable storage medium of claim 8, wherein at least one of the first dead-end state and the second dead-end state is a result of a freeze operation.

11. The non-transitory computer-readable storage medium of claim 8, wherein at least one of the first dead-end state and the second dead-end state is a result of an extend operation.

12. The non-transitory computer-readable storage medium of claim 8, wherein the at least one unsatisfied constraint is a soft constraint.

13. The non-transitory computer-readable storage medium of claim 8, wherein identifying at least one trace is based upon, at least in part, a formal engine analysis.

14. The non-transitory computer-readable storage medium of claim 8, wherein identifying at least one trace is based upon, at least in part, a quiet trace analysis.

15. A system comprising:
a computing device having at least one processor configured to display, at a graphical user interface, at least a portion of an assertion counter-example associated with an electronic design, the at least one processor further configured to allow, at the graphical user interface, a user to analyze the assertion counter-example during a debugging session, the at least one processor further configured to identify a first dead-end state during the analysis and to convert all constraints used in the debugging session to soft constraints, wherein each of the soft constraints indicate a preference that the assertion counterexample should satisfy if possible, but does not need to satisfy, the at least one processor further configured to identify at least one trace and avoid a second dead-end state, based upon, at least in part, the soft constraints, the at least one processor further configured to display at least one unsatisfied constraint associated with the identified trace at the graphical user interface.

16. The system of claim 15, wherein at least one of the first dead-end state and the second dead-end state is a result of adding one or more additional constraints.

17. The system of claim 15, wherein at least one of the first dead-end state and the second dead-end state is a result of a freeze operation.

18. The system of claim 15, wherein at least one of the first dead-end state and the second dead-end state is a result of an extend operation.

19. The system of claim 15, wherein the at least one unsatisfied constraint is a soft constraint.

20. The system of claim 15, wherein identifying at least one trace is based upon, at least in part, a formal engine analysis or a quiet trace analysis.

* * * * *